United States Patent [19]

Herziger et al.

[11] Patent Number: 5,014,282
[45] Date of Patent: May 7, 1991

[54] GAS LASER

[75] Inventors: Gerd Herziger, Roetgen-Rott; Peter Loosen, Aachen; Otto Marten, Aachen; Hartwig Böning, Aachen, all of Fed. Rep. of Germany

[73] Assignee: Fraunhofer-Gesellschaft zur Forderung der angewandten Forschung e.V., Fed. Rep. of Germany

[21] Appl. No.: 306,029
[22] PCT Filed: May 20, 1988
[86] PCT No.: PCT/DE88/00303
§ 371 Date: Jan. 23, 1989
§ 102(e) Date: Jan. 23, 1989
[87] PCT Pub. No.: WO88/09578
PCT Pub. Date: Dec. 1, 1988

[30] Foreign Application Priority Data

May 20, 1987 [DE] Fed. Rep. of Germany ....... 3716873

[51] Int. Cl.$^5$ ............................................. H01S 3/081
[52] U.S. Cl. ..................................... 372/93; 372/99; 372/107; 372/108; 372/95; 372/58; 372/87
[58] Field of Search ....................... 372/95, 92, 58, 59, 372/55, 61, 87, 93, 99, 107, 108

[56] References Cited

U.S. PATENT DOCUMENTS

| 3,904,983 | 9/1975 | Moreno et al. | 372/103 |
| 4,491,950 | 1/1985 | Hoffmann | 372/99 |
| 4,703,491 | 10/1987 | Lim | 372/107 |
| 4,723,256 | 2/1988 | Hoag | 372/107 |
| 4,757,512 | 7/1988 | Macken | 372/59 |
| 4,891,820 | 1/1990 | Rando et al. | 372/59 |

Primary Examiner—Léon Scott, Jr.
Attorney, Agent, or Firm—Evenson, Wands, Edwards, Lenahan & McKeown

[57] ABSTRACT

Gas laser, particularly carbon dioxide laser, with a component-free gas discharge chamber between high voltage electrodes, with a beam of two resonator end mirrors multiply folded between facing reflectors and with openings of the outwardly sealed gas discharge chamber permitting the inflow and outflow of gas. A gas laser with the aforementioned features is so constructed for the purpose of increasing its efficiency, that there is a continuous gas flow in the gas discharge chamber and that the gas flow direction is parallel to the longitudinal axis of the component-free gas discharge chamber located between the reflectors.

10 Claims, 4 Drawing Sheets

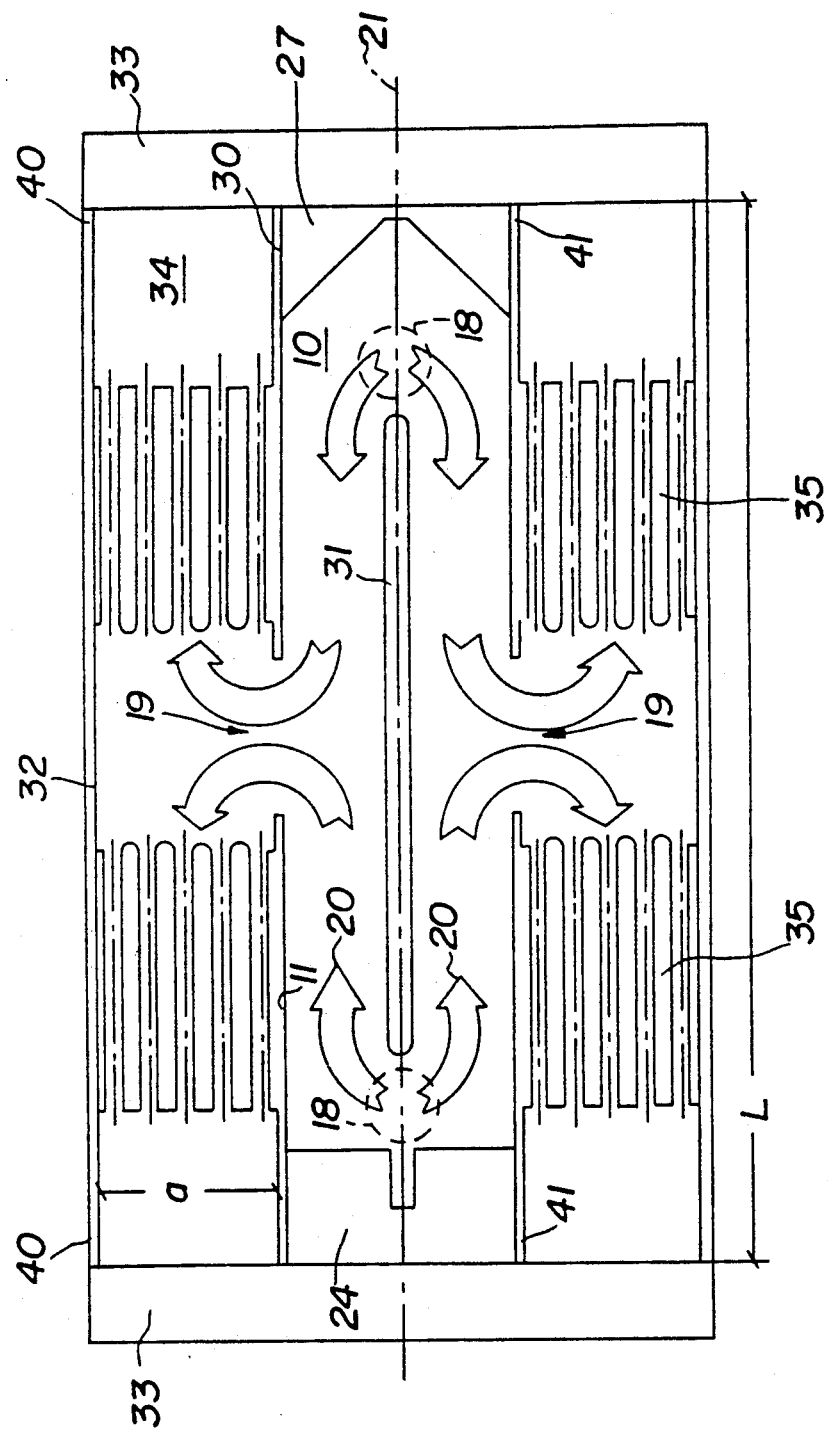

GAS LASER

TECHNICAL FIELD

The invention relates to a gas laser, particularly a carbon dioxide laser, with a component-free gas discharge chamber between high voltage electrodes, with a beam of two resonator end mirrors multiply folded between facing reflectors and with openings of the gas discharge chamber, which is sealed to the outside and permit gas inflow and outflow.

Prior Art

A gas laser of this type is known from DE-OS 35 16 232. This known laser is intended for motor vehicle ignition systems and for this purpose has a simple construction and limited space requirements. No cooling is provided.

DESCRIPTION OF THE INVENTION

The problem of the invention is to so improve a gas laser with the aforementioned features, particularly with respect to its component-free gas discharge chamber and whilst retaining its simple construction, that a higher efficiency is achieved, whilst maintaining an acceptable beam quality.

This problem is solved in that there is a continuous gas flow in the gas discharge chamber and that the gas flow direction is parallel to the longitudinal axis of the component-free gas discharge chamber located between the reflectors.

The aforementioned gas laser of DE-OS 35 16 232 admittedly has gas inlets and outlets, but they merely serve to be able to provide the interior of the laser with the desired gas filling or to replace said gas filling. There is no continuous gas flow. DE-OS 33 16 778 discloses a gas circulation through the discharge chamber. However, this has a central, thicker covered tubular electrode, which contributes to a turbulence of the flow in the direction of the beam, so that transverse density gradients occur in the laser gas, which leads to beam distortions.

Thus, it is important for the invention that the continuous gas flow or its gas flow direction is parallel to the longitudinal axis of the component-free discharge chamber. The multiply folded beam increases the compactness of the laser and in particular the flow cross-sections become larger with reduced flow lengths. This leads to smaller pressure differences, particularly in the discharge chamber, which also leads to an improvement in the beam quality when a laser efficiency rise occurs, whilst also offering the possibility of using less expensive pump systems with low pressure numbers, namely lateral channel and radial compressors. These advantages and in particular the high beam quality are obtained both with continuous and pulsating laser operation. Its compactness ensures high mechanical stability and also permits a considerable reduction to manufacturing costs.

The gas discharge chamber is at least a cross-sectionally rectangular flow channel, on whose ends are arranged bar shaped reflectors as spherically curved mirrors of roof edge mirrors folding the beam in U-shaped manner. The bar shaped reflectors are matched in optimum manner from the stability standpoint with this shape to the rectangular flow channel. The rectangular flow channel or the support tube surrounding the flow channel has a high angular impulse, so that any vibrations present through residual unbalances of rotary parts of blowers and the like only have a limited effect in the optical system of the laser. The stability of the optical system or the bar shaped reflectors or folding mirrors obtained is so considerable, that no importance is attached to the folding number increase, which has to be accepted in order to avoid a reduction of the beam diameter through multiple intermediate focusing in the case of reflection on the spherically curved mirrors. The roof edge mirror folding in U-shaped manner the beam also has a high mechanical stability with respect to vibrations and is comparatively insensitive, particularly in the case of small tilts about its roof edge axis, because there are only minor displacements of the beam portions between the reflectors.

In the case of a gas laser, particularly a carbon dioxide laser, with a gas discharge chamber and the beam of two resonator end mirrors multiply folded between facing reflectors, it is advantageous if the beam between the reflectors is arranged in at least two superimposed planes of the gas discharge chamber. Thus, through the folding of the beam, not only is it possible to achieve the compactness of the laser in the direction of its longitudinal axis between the reflectors, but this also occurs to a significant extent at right angles thereto. A greater mechanical stability of the resonator and a resulting improvement to the beam quality are obtained. The improved gas laser construction is permitted whilst fundamentally retaining the aforementioned components and in particular whilst retaining the described optical systems or reflectors, which can be inexpensively and reliably manufactured as spherically curved mirrors with a bolt shape or as roof edge mirrors. In addition, a reduction of the extension at right angles to the longitudinal axis ensures that the cross-section of the discharge chamber can be increased and its length reduced, so that the pump energy expenditure for a through-flow of the discharge chamber with laser gas can be considerably reduced. The beam can be arranged in several superimposed planes of the gas discharge chamber, i.e. in sandwich-like manner, instead of only in two such superimposed planes.

According to a further development of the invention, for the transfer of the beam between two planes, the gas laser has at least one edge-wise or on end arranged roof edge mirror, whose first mirror surface is level with the first beam plane and whose second mirror surface is level with the second beam plane. Through the provision of the roof edge mirror in the above-described manner, it is ensured that the beam portions defined by the roof edge mirror are arranged axially parallel to the remaining beam portions of the optical system. This leads to a uniform occupancy of the cross-section of the discharge chamber and consequently to a limited beam distortion.

It is not necessary to have only one edgewise roof edge mirror in order to achieve a single transfer of the beam between two planes and instead there can be several edgewise roof edge mirrors. Preferably there is an alternation of horizontally and vertically reflecting roof edge mirrors along the beam, all the vertically reflecting mirrors being at the same level. Thus, a beam is obtained, in which each horizontal fold follows a vertical fold. Through the combination of the roof edge mirrors a reflector construction or a construction of the complete resonator is obtained, which is relatively insensitive to tilting of the reflectors in each axis. This roof edge mirror arrangement also has the advantage that at one end of the discharge chamber all the roof edge mirrors are arranged in the same way. It is consequently advantageous if all the vertically reflecting roof edge mirrors are jointly in one piece, which facilitates manufacture, increases the reflection precision and improves the stability of the particular reflector, with all the desired positive consequences for the beam quality.

In another embodiment, apart from an edgewise mirror per plane change, all the beam planes contain exclusively horizontally reflecting roof edge mirrors. Thus, all the roof edge mirrors can be fundamentally identically constructed, which has an advantageous effect on production and its costs. In addition, all the roof edge mirrors of one plane can be produced in one piece on one reflector side and can be relatively easily fixed to the reflector portion of the other beam plane located on the same reflector side, in order to increase reflector stability.

According to a further development of the invention between the two beam planes of the gas discharge chamber formed by a rectangular tube, the gas laser has a plate-like centre electrode, which subdivides the gas discharge chamber into two parallel flow channels. An appropriate construction of the centre electrode can prevent turbulence between the flow channels. The advantages of the longitudinally axially parallel gas through-flow can consequently be retained in the case of a rectangular bounding of the gas discharge chamber, even when using a centre electrode. Use can be made of the advantages of the centre electrode, i.e. the avoidance of stray fields and parasitic discharges.

Advantageously the vertical clearance of the rectangular tube is the same as the mirror height, so that the two reflectors can be fitted into the frontal openings of the rectangular tube, which facilitates the arrangement thereof and improves the stability.

In the case of a gas laser, particularly a carbon dioxide laser, with a component-free gas discharge chamber and a beam of two resonator end mirrors multiply folded between facing reflectors, provision is made of an outer tube, which surrounds a tube forming the gas discharge chamber in spaced manner over its entire length and to its ends are fixed carrier plates of the mirrors and the tube forming the discharge chamber.

The outer tube can be constructed as a supporting element which, as a result of its large external diameter and the associated large angular impulse, leads to a considerable stability improvement for the entire system. In particular, the support plates for the reflectors or for the entire optical system are held much more securely against the influence of vibrations than with the conventional constructional principles, which particularly in the case of sensitive resonator structures prove inadequate, i.e. in the case of unstable resonators or resonators with a high beam quality, long beam paths or numerous folds. The outer tube and the tube forming the gas discharge chamber can be rigidly interconnected via support plates and the resulting annular space can fulfill further laser functions, apart from the increased mechanical stability and low weight.

Advantageously the annular space formed by the outer tube is a return flow channel connected to the gas inlet and gas outlet on the discharge chamber and which contains gas coolers. The outer tube consequently is responsible in the gas flow circuit for the return of the gas, as well as the cooling thereof in conjunction with gas coolers. The outer tube is at the same time a vacuum flask, because the operating pressure is e.g. only 100 mbar.

The gas coolers are assembled in supporting manner with the outer tube and/or with the discharge tube and, if necessary, form one of the electrodes. The integration of gas coolers and outer tube or gas coolers and discharge tube improves the stability of the overall structure, because the gas coolers form a supporting component in the return flow channel. The inner wall of the gas coolers can itself form the rectangular tube or discharge tube and it is obvious to enable the gas cooler or its inner wall to form one of the electrodes, particularly the electrode at earth potential.

According to a further development of the invention, in the vicinity of its ends, the discharge chamber has in each case one gas inlet and centrally a common gas outlet connected to the annular space of the outer tube. There is consequently a gas flow, which is directed from the reflector-side ends of the gas discharge chamber to its centre, so that a scavenging of the reflectors or the optical system is avoided and consequently there is no harmful effect due to particles entrained in the gas flow and which in particular can lead to a blinding of the optical system at high flow rates.

An extreme shortening of the beam through its multiple folding and a large flow cross-section is particularly desired in the case of high through-flow rates, which are in turn necessary in order to remove the power dissipation, which in particular occurs at medium to high power levels of the carbon dioxide laser for thin and thick metal plate working.

BRIEF DESCRIPTION OF THE DRAWINGS

The invention is described hereinafter relative to embodiments and the attached drawings, wherein show:

FIG. 4 a diagrammatic longitudinal sectional representation of a gas laser and its flow circuit.

BEST WAYS TO REALIZE THE INVENTION

Figure 1:
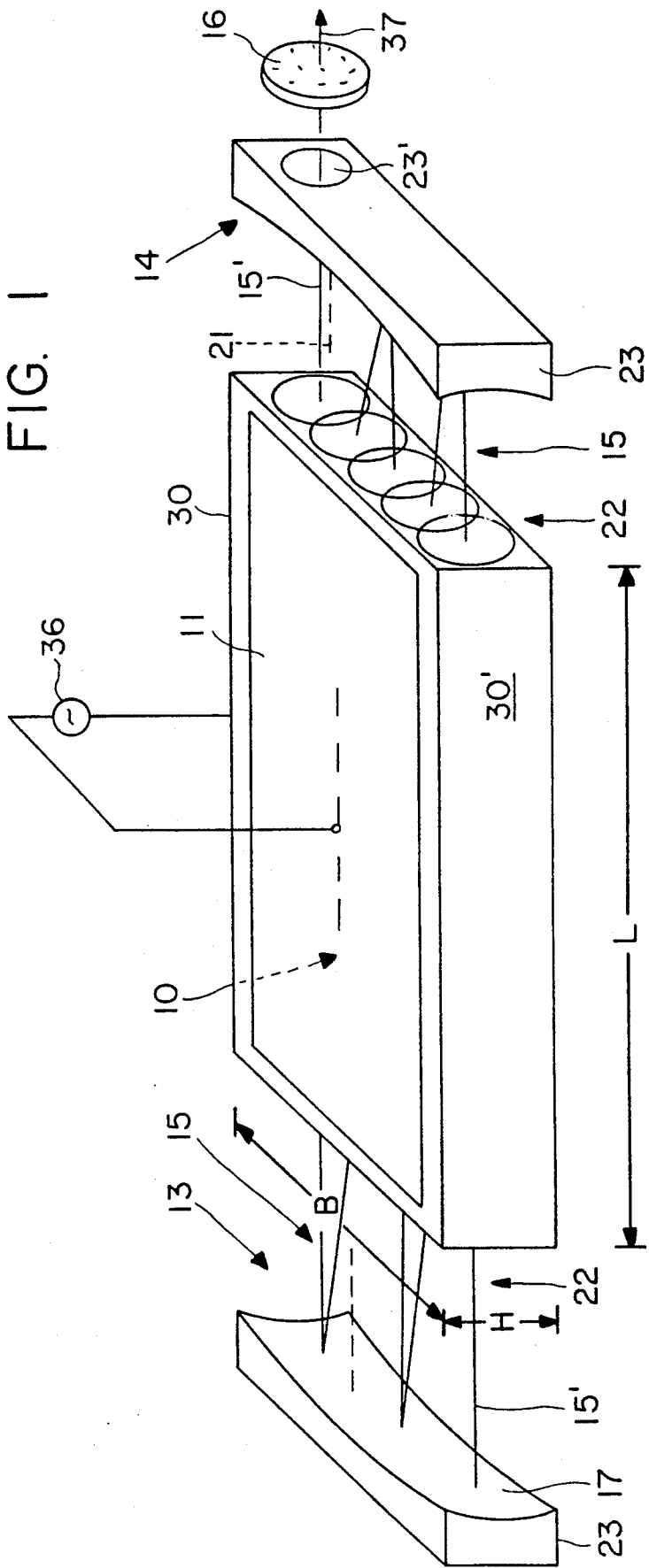
FIG. 1 a perspective diagrammatic representation of a gas laser with component-free, rectangular gas discharge chamber.

FIG. 1 shows in drawn-apart, diagrammatic form the most important components of a laser, namely its reflectors 13, 14 on faces 22 of a gas discharge chamber 10, which is formed by a rectangular cross-section discharge tube 30. Discharge tube 30 has or forms a high voltage electrode 11, which is supplied with a high frequency voltage by a high voltage source 36. A further, not shown electrode is connected to voltage source 36, which is e.g. formed by the bottom of discharge tube 30 and must be electrically insulated with respect to electrode 11, e.g. in that the side walls 30' of tube 30 are made from a dielectric.

The gas discharge chamber 10 located between the two electrodes is free from components and serves fully for the reception of the laser beam 15. The circles shown on the right-hand face 22 of discharge chamber 10 indicate the beam cross-section. Thus, it is clear that the discharge chamber 10 has a volume defined by its length L, its height H and its width B, which is filled by the beam 15. This is obtained through the folding of beam 15 in a plurality of beam portions 15'. This folding takes place with the aid of reflectors 13, 14, which according to FIG. 14 are bar shaped, spherically curved mirrors 23. Mirror 23 of reflector 13 forms a resonator end mirror 17, whilst mirror 23 of reflector 14 has a beam passage opening 23' to a resonator end mirror 16, which is semitransparent, so that, in accordance with arrow 37, a corresponding beam part can be supplied as an external laser beam for the intended use, e.g. the cutting and welding of metals and nonmetals, surface finishing, etc. in the kW or multi-kW range.

According to the invention there is a continuous gas flow in gas discharge chamber 10. This gas flow has a direction which is parallel or substantially parallel to the longitudinal axis 21, which is shown in FIG. 1 in broken line form between reflectors 13, 14. Such a gas flow is e.g. produced by not shown gas inlets and outlets of a gas circulating system located in the vicinity of the faces 22 of the gas discharge chamber 10. The arrangement of the openings takes place in such a way that a significant transverse flow component is avoided, i.e. at right angles to longitudinal axis 21, in order to avoid the influencing of the beam quality through transversely directed density gradients of the gas.

In FIG. 1 the beam 15 is folded in V-shaped manner within the laser by reflectors 13, 14. Compared therewith, FIG. 2 shows a mirror arrangement for the U-shaped folding by means of so-called roof edge mirrors 24 or 27, whose mirror surfaces 24', 24" are at right angles to one another, so that the U-shaped beam configuration shown in dot-dash form is obtained.

Figure 2:
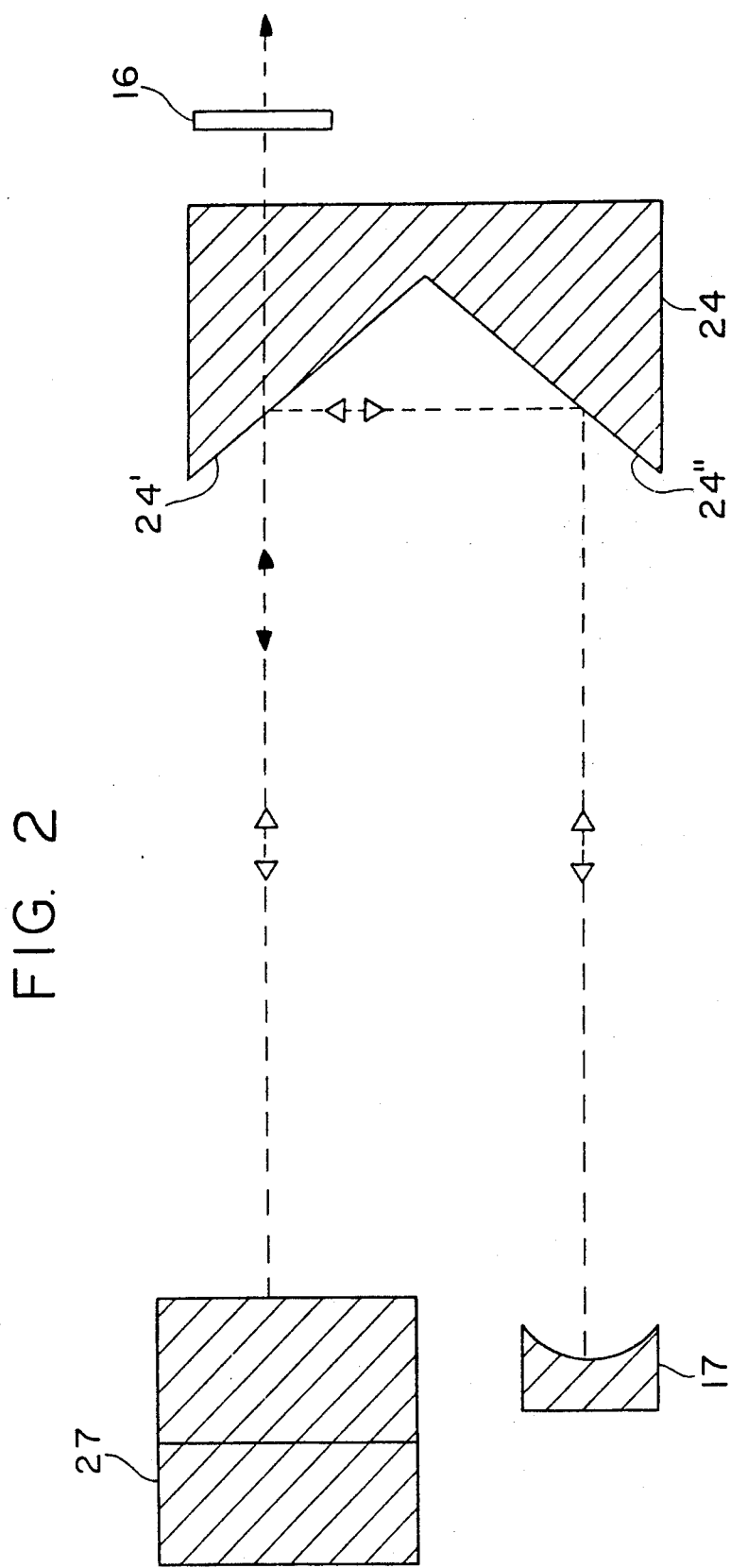
FIG. 2 a diagrammatic representation of two roof edge mirrors displaced by 90° with respect to one another.

A special feature of FIG. 2 is that, in conjunction with a horizontally arranged roof edge mirror 24, use is made of an edgewise roof edge mirror 27, which is thus rotated by 90° and which also brings about a U-shaped folding of the beam, but in a vertical plane. Thus, two superimposed beam planes are obtained, which can be better seen from the perspective view of FIG. 3 and which are designated by the reference numerals 25 and 26. Thus, in connection with FIG. 2, it is to be assumed that it gives a first beam plane, in which the roof edge mirror 24 reflects, so that the beam configuration indicated by the hollow arrows is obtained between the lower mirror surface of roof edge mirror 27 in the drawing plane, the mirror surfaces 24', 24" and the resonator end mirror 17, whilst in the plane located above it is obtained the beam configuration indicated by the continuously drawn arrows between the mirror surface of the roof edge mirror 27 located over the representation plane and another, semitransparent resonator end mirror 16.

Figure 3:
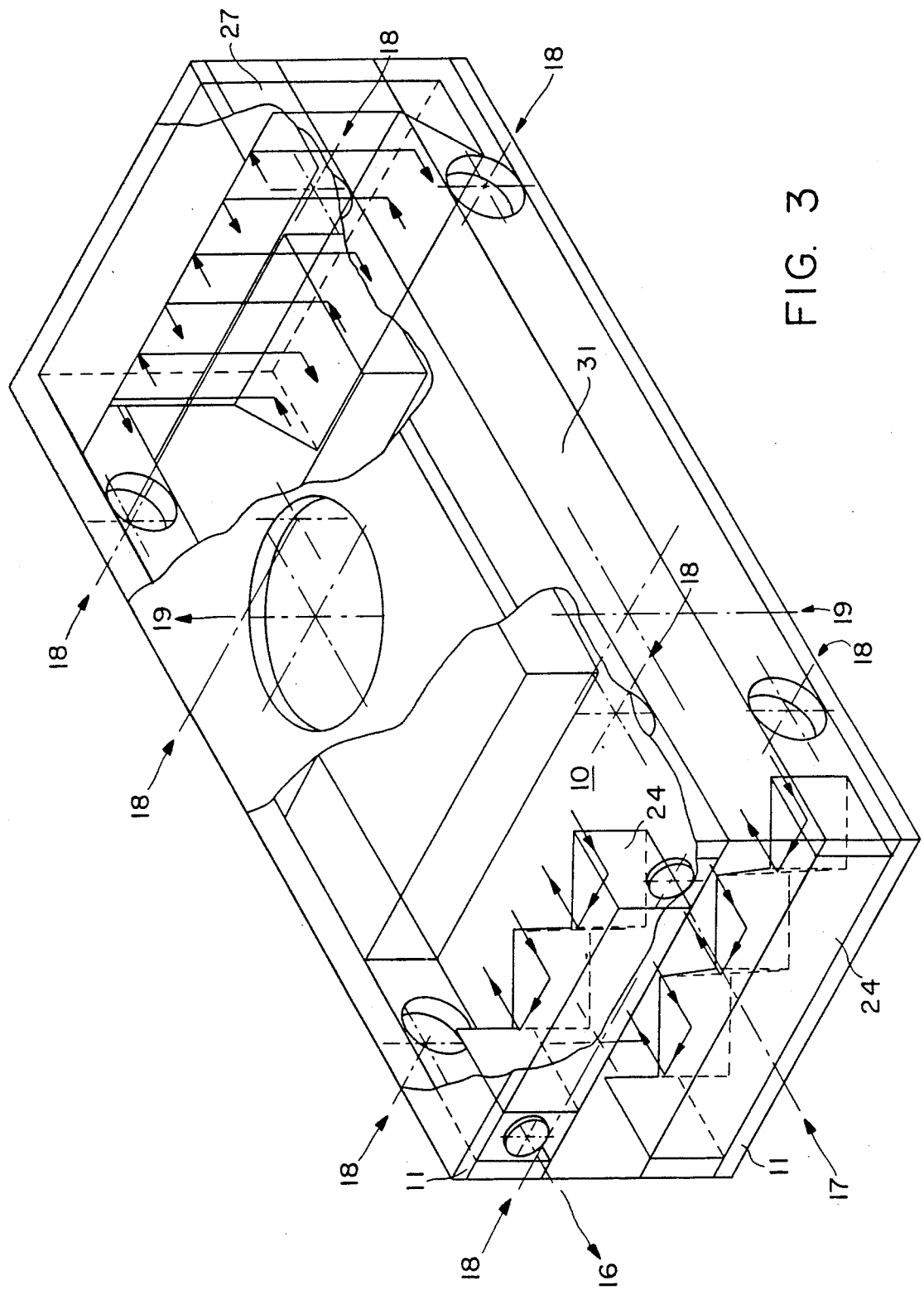
FIG. 3 a perspective, diagrammatic representation of the optical system with reflectors comprising roof edge mirrors.

In FIG. 3 the parallelepipedic contour 38 defines the resonator volume of the gas laser with the discharge chamber 10 and the reflectors 13, 14 arranged at the front thereof. Between the resonator end mirrors 16, 17 beam 15 is folded and its configuration is indicated by the dotted line beam axis portion 39. Beam 15 is consequently multiply U-folded and namely in two superimposed planes 25, 26 of the gas discharge chamber 10. The transfer of beam 15 between the two planes 25, 26 takes place in multiple manner by roof edge mirrors 27. Each roof edge mirror 27 has a first mirror surface 28, which is arranged in the lower beam plane 25 and a second mirror surface 29 positioned level with the second beam plane 26. It can be gathered from the configuration of the beam axis portions 39 provided with arrows, that each U-shaped fold within the beam plane 25 is followed by a U-shaped fold in beam plane 26, where there is a further U-fold, followed by a fold in the lower beam plane 25 and so on. Thus, according to FIG. 3, there are four beam portions in the upper and six in the lower plane.

The roof edge mirrors 27 of reflector 14 are all edgewise juxtaposed and are therefore appropriately made in one piece, whereas the roof edge mirrors 24 of reflector 13 are juxtaposed and superimposed. The juxtaposed roof edge mirrors 24 can be manufactured with a bar shape, so that such a bar can be connected in stable manner with a bar in the plane located above it.

FIG. 4 shows an embodiment of a particularly stable and therefore vibration-insensitive resonator structure in cross-section. A gas discharge tube 30 with a rectangular cross-section is surrounded by a rectangular or round outer tube 32, accompanied by the formation of an annular space 34. Both tubes 30, 32 have the same length and are interconnected at a distance L by support plates 33, which act on the ends 40, 41 of said tubes. The support plates 33 also carry the mirrors 24, 27 of the reflectors and the not shown resonator end mirrors. This leads to a very compact and stable construction of the gas laser. This is aided by the integration of gas coolers 35 in annular space 34, which forms a return flow channel between a gas inlet 18 and a gas outlet 19. FIG. 4 shows two gas coolers 35 adapted to the cross-section of annular space 34 and which are in each case assembled in supporting manner with discharge tube 30 and outer tube 32. In particular, the discharge chamber-side surface of the gas cooler 35 forms part of the discharge tube 30, which defines the discharge chamber 10. Discharge tube 30 or gas coolers 35 can therefore form an electrode 11, which is appropriately at earth potential. Thus, the complete gas discharge chamber 30 is shielded to the outside by said electrode and completely surrounds the second electrode in the form of a plate-like centre electrode. Thus, external stray fields and parasitic discharges to other metallic parts are avoided.

In FIG. 4 the discharge chamber 10 is subdivided by the centre electrode 31 into two parallel flow channels, in which can be produced a continuous gas flow in gas flow direction 20 parallel to the longitudinal axis 21. This function is fulfilled by the diagrammatically shown gas inlets 18, which are in fact e.g. slits parallel to the faces 22 (cf. FIG. 1), in order to bring about the desired gas flow direction. Moreover, in the centre of the discharge tube 30 is provided a gas outlet 19, so that the laser gas can flow in accordance with the arrows into the gas coolers 35.

FIG. 4 makes it clear that the gas flows away from the mirrors 24, 27, i.e. the latter are not influenced in the sense of a blinding action by the entrained suspended particles.

The beam configuration in FIG. 4 is in two superimposed planes, the roof edge mirrors 24 being used for the horizontal U-shaped folding, whereas the edgewise mirrors 27 are used for the vertical U-shaped folding of the beam.

Industrial usability

Whilst retaining an acceptable beam quality and simple construction, the use of the inventive laser permits the less expensive manufacture of very efficient lasers.

We claim:

1. A gas laser comprising:

a rectangular gas discharge chamber having first and second end faces;

roof edge mirrors disposed at said end faces, said roof edge mirrors having reflector surfaces that multiply fold a laser beam generated in said gas discharge chamber on a beam path that is substantially U-shaped, said roof edge mirrors at one of said end faces comprising a plurality of bolt-shaped reflectors having reflector surfaces in at least first and second superimposed planes of the gas discharge chamber, and at least one roof edge mirror positioned on an edge at another of said end faces and having first and second mirror surfaces to fold the beam path between the first and second superimposed planes of said bolt-shaped reflectors, the first mirror surface of said roof edge mirror positioned on an edge being at a level of the first superimposed plane and the second mirror surface of said roof edge mirror positioned on an edge being at a level of the second superimposed plane;

a voltage source applying a potential between a first dielectric electrode and a second center dielectric electrode, said first dielectric electrode forming a surface of said gas discharge chamber, and said second center dielectric electrode subdividing said gas discharge chamber into parallel longitudinal flow channels; and openings in said gas discharge chamber for providing an inflow and an outflow of gas through said longitudinal flow channels, thereby providing stability of the beam reflectance which results in an improved beam quality.

2. Gas laser according to claim 1, wherein said plurality of bolt-shaped reflectors and said first and second mirror surfaces are disposed i said beam path such that said beam path is alternatingly folded horizontally and vertically, the first mirror surfaces all being arranged at a first height and the second mirror surfaces all being arranged at a second height.

3. Gas laser according to claim 2, further comprising a plurality of roof edge mirrors positioned on an edge and which are all jointly in one piece.

4. Gas laser according to claim 1, wherein there are exclusively horizontally reflecting bolt-shaped reflectors and one of said first or second mirror surfaces in each of said first and second superimposed planes.

5. Gas laser according to claim 1 wherein the vertical clearance of the rectangular tube is the same as the mirror height.

6. Gas Laser according to claim 1, further comprising an outer tube which surrounds over its entire length (L) the gas discharge chamber, a space (a) being formed between said outer tube and the gas discharge chamber and to whose ends are fixed support plates of the mirrors and a tube which forms the gas discharge chamber.

7. Gas laser according to claim 6, wherein the space formed by the outer tube is a return flow channel connected to the gas inlet and gas outlet on the gas discharge chamber and in which there are gas coolers.

8. Gas laser according to claim 7, wherein the gas coolers provide support to at least one of the outer tube and the gas discharge chamber and form one of the electrodes.

9. Gas laser according to claim 6, wherein the gas chamber in each case has one gas inlet and centrally a common gas outlet connected to the space of the outer tube.

10. A gas laser comprising:

a rectangular gas discharge chamber having first and second end faces;

roof edge mirrors disposed at said end faces, said roof edge mirrors having reflector surfaces that multiply fold a laser beam generated in said gas discharge chamber on a beam path that is substantially U-shaped, said roof edge mirrors at one of said end faces comprising a plurality of bar shaped reflectors having reflector surfaces in at least first and second superimposed planes of the gas discharge chamber, and at least one roof edge mirror positioned on an edge at another of said end faces and having first and second mirror surfaces to fold the beam path between the first and second superimposed planes of said bolt-shaped reflectors, the first mirror surface of said roof edge mirror positioned on an edge being at a level of the first superimposed plane and the second mirror surface of said roof edge mirror positioned on an edge being at a level of the second superimposed plane;

a voltage source applying a potential between a first dielectric electrode and a second dielectric electrode, said first and second dielectric electrodes forming surfaces of said gas discharge chamber and a parallel longitudinal flow channel; and openings in said gas discharge chamber for providing an inflow and an outflow of gas through said longitudinal flow channels, thereby providing stability of the beam reflectance which results in an improved beam quality.

* * * * *